United States Patent
Ma et al.

(10) Patent No.: US 11,483,681 B2
(45) Date of Patent: Oct. 25, 2022

(54) SPECIAL EFFECT SYNCHRONIZATION METHOD, DEVICE, AND STORAGE MEDIUM

(71) Applicant: BEIJING BYTEDANCE NETWORK TECHNOLOGY CO., LTD., Beijing (CN)

(72) Inventors: Ruifeng Ma, Beijing (CN); Le Gao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/559,768

(22) Filed: Dec. 22, 2021

(65) Prior Publication Data
US 2022/0116746 A1    Apr. 14, 2022

Related U.S. Application Data

(63) Continuation of application No. PCT/CN2020/091847, filed on May 22, 2020.

(30) Foreign Application Priority Data

Jun. 25, 2019   (CN) .......................... 201910556470.9

(51) Int. Cl.
*H04W 4/06* (2009.01)
*H04W 76/15* (2018.01)
(Continued)

(52) U.S. Cl.
CPC ............ *H04W 4/06* (2013.01); *G06F 3/1454* (2013.01); *H04W 56/0015* (2013.01); *H04W 76/14* (2018.02); *H04W 76/15* (2018.02)

(58) Field of Classification Search
CPC ... H04W 4/06; H04W 56/0015; H04W 76/14; H04W 76/15; G06F 3/1454
See application file for complete search history.

(56) References Cited

U.S. PATENT DOCUMENTS

2013/0324042 A1   12/2013   Shinomiya
2015/0163302 A1 *  6/2015   Armstrong .......... H04L 67/1097
                                                       709/217
(Continued)

FOREIGN PATENT DOCUMENTS

CN    102752748 A    10/2012
CN    103529945 A     1/2014
(Continued)

OTHER PUBLICATIONS

International Patent Application No. PCT/CN2020/091847; Int'l Written Opinion and Search Report; dated Aug. 24, 2020; 8 pages.

*Primary Examiner* — Walli Z Butt
(74) *Attorney, Agent, or Firm* — BakerHostetler

(57) ABSTRACT

The present disclosure provides a special effect synchronization method, device, and a storage medium; wherein the method comprises: receiving a synchronization request for synchronizing the special effect file sent by a special effect preview end; based on the synchronization request, when determining that a direct connection condition is satisfied, establishing a communication link with the special effect preview end in a direct connection mode; receiving an acquisition request for the target special effect file through the communication link; synchronizing the target special effect file to the special effect preview end based on the acquisition request.

17 Claims, 7 Drawing Sheets

(51) Int. Cl.
*H04W 76/14* (2018.01)
*G06F 3/14* (2006.01)
*H04W 56/00* (2009.01)

(56) References Cited

U.S. PATENT DOCUMENTS

| | | | | |
|---|---|---|---|---|
| 2015/0188983 | A1* | 7/2015 | Elias | H04W 12/08 |
| | | | | 715/744 |
| 2017/0063982 | A1* | 3/2017 | Doherty | H04L 67/1078 |
| 2017/0243403 | A1* | 8/2017 | Daniels | G06T 19/20 |

FOREIGN PATENT DOCUMENTS

| | | |
|---|---|---|
| CN | 103561281 A | 2/2014 |
| CN | 104093064 A | 10/2014 |
| CN | 104333598 A | 2/2015 |
| CN | 104754370 A | 7/2015 |
| CN | 105100880 A | 11/2015 |
| CN | 106375479 A | 2/2017 |
| CN | 106453574 A | 2/2017 |
| CN | 110324413 A | 10/2019 |

\* cited by examiner

SPECIAL EFFECT SYNCHRONIZATION METHOD, DEVICE, AND STORAGE MEDIUM

CROSS REFERENCE OF RELATED APPLICATION

The present application is a continuation of PCT International Patent Application of PCT/CN2020/091847, filed on May 22, 2020, which claims the priority to Chinese Patent Application No. 201910556470.9, titled "SPECIAL EFFECT SYNCHRONIZATION METHOD, DEVICE, AND STORAGE MEDIUM", filed on Jun. 25, 2019 with the State Intellectual Property Office of the PRC, both of which are incorporated herein by reference in their entireties.

FIELD

The present disclosure relates to technical field of computers, and in particular to a method and an apparatus for synchronizing a special effect, a terminal and a storage medium.

BACKGROUND

A user produces a special effect by using a special effect producing tool on a desktop end, and then synchronizes the produced special effect to a mobile phone application (APP) for previewing in real time. Generally, the user uploads a special effect to be previewed to a special effect development platform by a special effect producing software, and then downloads the special effect from the special effect development platform through the mobile phone APP. In the method, the file is transmitted temporarily by the special effect development platform, and thus unnecessary traffic is generated for the special effect development platform. In addition, the uploading and downloading of the special effect is limited due to a bandwidth, resulting in that consumed previewing time is long.

SUMMARY

In view of above, a method and an apparatus for synchronizing a special effect, a terminal and a storage medium are provided according to embodiments of the present disclosure.

A method for synchronizing a special effect is provided according to embodiments of the present disclosure. The method includes: receiving a synchronization request for synchronizing a special effect file transmitted by a special effect preview end; establishing, in response to the synchronization request, a communication link with the special effect preview end via direct connection if a direct connection condition is satisfied; receiving an acquisition request for a target special effect file through the communication link; and synchronizing the target special effect file to the special effect preview end in response to the acquisition request.

In the above solution, the process of receiving a synchronization request for synchronizing a special effect file transmitted by a special effect preview end includes: receiving the synchronization request for synchronizing a special effect file through a multicast group, in response to a special effect producing end being currently located in the multicast group. The synchronization request is transmitted by the special effect preview end based on a multicast address of the multicast group.

In the above solution, the process of establishing, in response to the synchronization request, a communication link with the special effect preview end via direct connection if a direct connection condition is satisfied includes: establishing, in response to the synchronization request, a communication link with the special effect preview end via direct connection if it is determined that a special effect producing end and the special effect preview end are located in a same local area network.

In the above solution, the process of establishing a communication link with the special effect preview end via direct connection includes: displaying a graphic code via a graphical interface, where the graphic code comprises an internet protocol (IP) address; receiving a link establishing request transmitted by the special effect preview end based on the IP address, where the IP address is obtained by scanning the graphical code by the special effect preview end; and establishing a communication link with the special effect preview end via direct connection.

In the above solution, the process of synchronizing the target special effect file to the special effect preview end in response to the acquisition request includes: analyzing the acquisition request to obtain a file identifier of the target special effect file; and synchronizing the target special effect file to the special effect preview end based on the file identifier. The file identifier is obtained by scanning the graphic code by the special effect preview end.

In the solution, the process of establishing, in response to the synchronization request, a communication link with the special effect preview end via direct connection if a direct connection condition is satisfied includes: establishing, in response to a synchronization request transmitted in a form of a bluetooth connection signal, a communication link with the special effect preview end via direct connection if the direct connection condition is satisfied.

In the above solution, the method further includes: synchronizing, in response to the synchronization request, the target special effect file to a special effect development platform if the direct connection condition is not satisfied; and displaying a graphic code via a graphical interface, where the graphic code includes a file identifier of the target special effect file and the file identifier is obtained by scanning the graphic code by the special effect preview end; and acquiring the target special effect file from the special effect development platform based on the obtained file identifier.

In the above solution, the method further includes: displaying prompt information when the target special effect file fails to be synchronized to the special effect development platform, where the prompt information indicates connecting to a local area network where the special effect preview end is located.

A method for synchronizing a special effect is provided according to embodiments of the present disclosure. The method includes: transmitting a synchronization request for synchronizing a special effect file to a special effect producing end; establishing a communication link with the special effect producing end via direct connection based on a response that the special effect producing end determines that a direct connection condition is satisfied in response to the synchronization request; transmitting an acquisition request for a target special effect file through the communication link; and receiving the target special effect file synchronized by the special effect producing end.

In the above solution, the process of transmitting a synchronization request for synchronizing a special effect file to a special effect producing end includes: acquiring a multicast address of a multicast group where the special effect producing end is located; and transmitting the synchronization request for synchronizing the special effect file to the special effect producing end based on the multicast address of the multicast group.

In the above solution, the process of establishing a communication link with the special effect producing end via direct connection based on a response that the special effect producing end determines that a direct connection condition is satisfied in response to the synchronization request includes: establishing a communication link with the special effect preview end via direct connection based on a response that it is determined that the special effect producing end and a special effect preview end are located in a same local area network.

In the above solution, the process of establishing a communication link with the special effect producing end via direct connection based on a response that it is determined that the special effect producing end and a special effect preview end are located in a same local area network includes: scanning a graphic code displayed by a graphical interface of the special effect producing end, to obtain an IP address of the special effect producing end, where the graphic code includes the IP address of the special effect producing end; transmitting a link establishing request based on the IP address; and establishing a communication link with the special effect producing end via direct connection.

In the above solution, the process of receiving the target special effect file synchronized by the special effect producing end includes: receiving the target special effect file synchronized by the special effect producing end based on a file identifier. The file identifier is obtained by analyzing the acquisition request by the special effect producing end.

In the solution, the process of establishing a communication link with the special effect producing end via direct connection based on a response that the special effect producing end determines that a direct connection condition is satisfied in response to the synchronization request includes: establishing a communication link with the special effect producing end via direct connection based on a response that the special effect producing end determines that a direct connection condition is satisfied in response to the synchronization request transmitted in a form of a Bluetooth connection signal.

In the solution, the method further includes: scanning a graphic code displayed when the special effect producing end determines that the direct connection condition is not satisfied in response to the synchronization request, to obtain a file identifier of the target special effect file; and acquiring the target special effect file synchronized to the special effect development platform by the special effect producing end based on the file identifier.

In the solution, the method further includes: displaying prompt information when the target special effect file synchronized to the special effect development platform by the special effect producing end fails to be acquired, where the prompt information indicates connecting to a local area network where the special effect producing end is located.

An apparatus for synchronizing a special effect is provided according to embodiments of the present disclosure. The apparatus includes a first receiving unit, a first processing unit, a first communication unit and a synchronization unit. The first receiving unit is configured to receive a synchronization request for synchronizing a special effect file transmitted by a special effect preview end. The first processing unit is configured to establish, in response to the synchronization request, a communication link with the special effect preview end via direct connection if a direct connection condition is satisfied. The first communication unit is configured to receive an acquisition request for a target special effect file through the communication link. The synchronization unit is configured to synchronize the target special effect file to the special effect preview end in response to the acquisition request.

In the above solution, the first receiving unit is further configured to receive the synchronization request for synchronizing a special effect file through a multicast group, in response to a special effect producing end being currently located in the multicast group. The synchronization request is transmitted by the special effect preview end based on a multicast address of the multicast group.

In the above solution, the first processing unit is further configured to establish, in response to the synchronization request, a communication link with the special effect preview end via direct connection if it is determined that a special effect producing end and the special effect preview end are located in a same local area network.

In the above solution, the first processing unit is further configured to display a graphic code via a graphical interface, where the graphic code includes an IP address; receive a link establishing request transmitted by the special effect preview end based on the IP address, where the IP address is obtained by scanning the graphical code by the special effect preview end; and establish a communication link with the special effect preview end via direct connection.

In the above solution, the synchronization unit is further configured to: analyze the acquisition request to obtain a file identifier of the target special effect file; and synchronize the target special effect file to the special effect preview end based on the file identifier. The file identifier is obtained by scanning the graphic code by the special effect preview end.

In the above solution, the first processing unit is further configured to: establish, in response to a synchronization request transmitted in a form of a bluetooth connection signal, a communication link with the special effect preview end via direct connection if the direct connection condition is satisfied.

In the above solution, the first processing unit is further configured to: synchronize, in response to the synchronization request, the target special effect file to a special effect development platform if the direct connection condition is not satisfied; and display a graphic code via a graphical interface, where the graphic code includes a file identifier of the target special effect file and the file identifier is obtained by scanning the graphic code by the special effect preview end; and acquiring the target special effect file from the special effect development platform based on the obtained file identifier.

In the above solution, the first displaying unit is further configured to: display prompt information when the target special effect file fails to be synchronized to the special effect development platform, where the prompt information indicates connecting to a local area network where the special effect preview end is located.

An apparatus for synchronizing a special effect is provided according to embodiments of the present disclosure. The apparatus includes a transmitting unit, a second processing unit, a second communication unit and a second receiving unit. The transmitting unit is configured to: transit a synchronization request for synchronizing a special effect file to a special effect producing end. The second processing unit is configured to establish a communication link with the special effect producing end via direct connection based on a response that the special effect producing end determines that a direct connection condition is satisfied in response to the synchronization request. The second communication unit is configured to transmit an acquisition request for a target special effect file through the communication link. The second receiving unit is configured to: receive the target special effect file synchronized by the special effect producing end.

In the above solution, the transmitting unit is configured to: acquire a multicast address of a multicast group where the special effect producing end is located; and transmit the synchronization request for synchronizing the special effect file to the special effect producing end based on the multicast address of the multicast group.

In the above solution, the second processing unit is further configured to: establish a communication link with the special effect preview end via direct connection based on a response that it is determined that a special effect preview end and he special effect producing end are located in a same local area network in response to the synchronization request.

In the above solution, the second processing unit is further configured to: scan a graphic code displayed by a graphical interface of the special effect producing end, to obtain an IP address of the special effect producing end, where the graphic code includes the IP address of the special effect producing end; transmit a link establishing request based on the IP address; and establish a communication link with the special effect producing end via direct connection.

In the above solution, the second receiving unit is further configured to: receive the target special effect file synchronized by the special effect producing end based on a file identifier. The file identifier is obtained by analyzing the acquisition request by the special effect producing end.

In the above solution, the second processing unit is further configured to: establish a communication link with the special effect producing end via direct connection based on a response that the special effect producing end determines that a direct connection condition is satisfied in response to the synchronization request transmitted in a form of a Bluetooth connection signal.

In the above solution, the second processing unit is further configured to: scan a graphic code displayed when the special effect producing end determines that the direct connection condition is not satisfied in response to the synchronization request, to obtain a file identifier of the target special effect file; and acquire the target special effect file synchronized to the special effect development platform by the special effect producing end based on the file identifier.

In the above solution, the apparatus further includes a second display unit configured to: display prompt information when the target special effect file synchronized to the special effect development platform by the special effect producing end fails to be acquired. The prompt information indicates connecting to a local area network where the special effect producing end is located.

A terminal is provided according to embodiments of the present disclosure. The terminal includes a first memory and a first processor. The first memory is configured to store an executable instruction. The first processor is configured to execute the executable instruction stored in the first memory to perform the method for synchronizing a special effect according to the embodiments of the present disclosure.

A terminal is provided according to embodiments of the present disclosure. The terminal includes a second memory and a second processor. The second memory is configured to store an executable instruction. The second processor is configured to execute the executable instruction stored in the second memory, to perform the method for synchronizing a special effect according to the embodiments of the present disclosure.

A storage medium storing an executable instruction is provided according to embodiments of the present disclosure. The executable instruction is executed to perform the method for synchronizing a special effect according to the embodiments of the present disclosure.

A storage medium storing an executable instruction is provided according to embodiments of the present disclosure. The executable instruction is executed to perform the method for synchronizing a special effect according to the embodiments of the present disclosure.

The embodiments of the present disclosure have the following beneficial effects. According to the embodiments of the present disclosure, a communication link is established with a special effect preview end via direct connection if a direct connection condition is satisfied, and a target special effect file is synchronized to the special effect preview end through the communication link. The communication link is established with the special effect preview end via direct connection, so that the target special effect file can be directly synchronized to the special effect preview end rather than the special effect file is uploaded to the special effect development platform for temporary transmission and then the special effect file is downloaded from the special effect development platform, thereby avoiding generating unnecessary traffic for the special effect development platform and shortening preview time.

DETAILED DESCRIPTION

Figure 1:
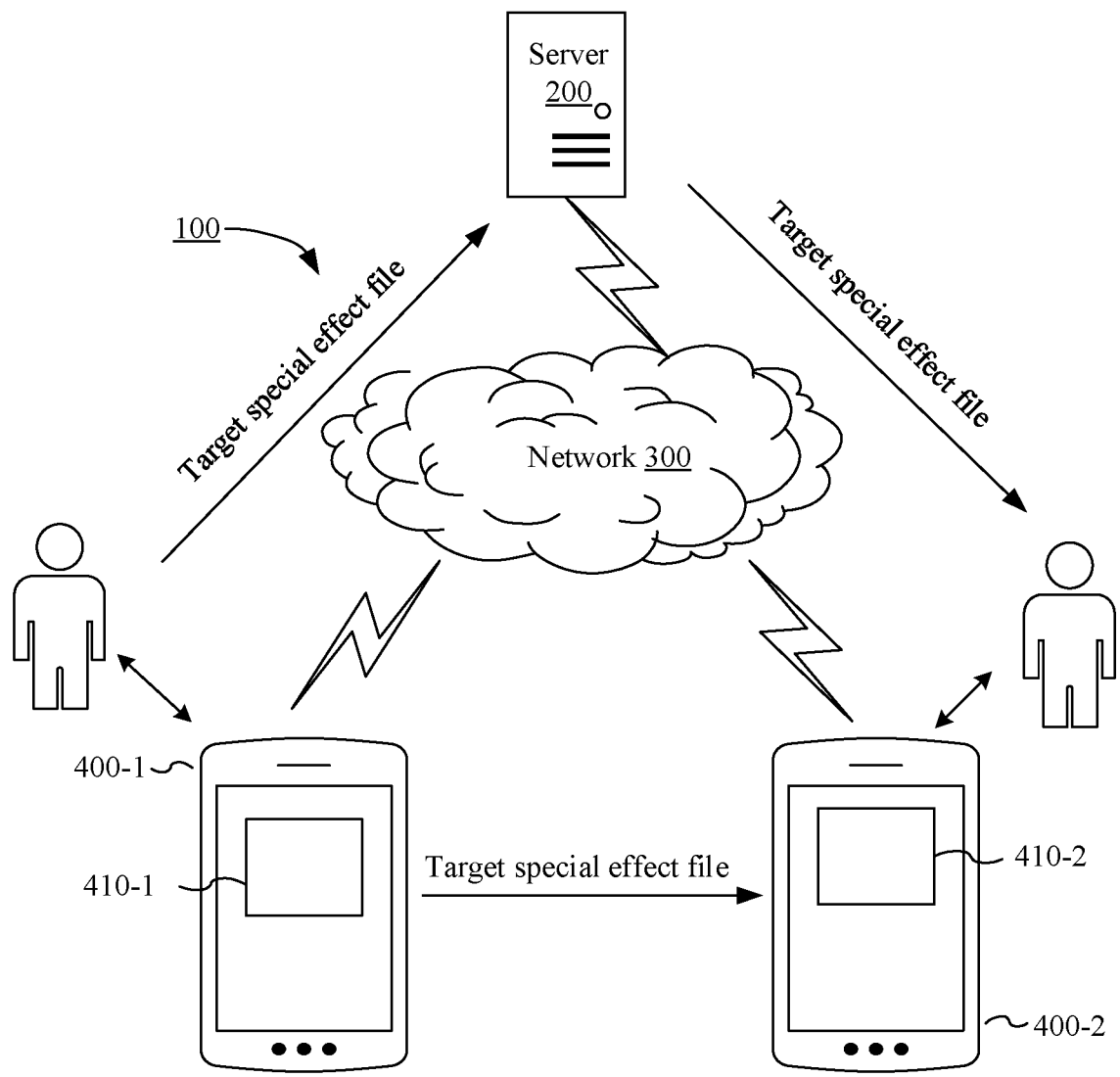
FIG. 1 is a schematic structural diagram of s system for synchronizing a special effect according to an embodiment of the present disclosure.

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the embodiments of the present disclosure may be performed in different orders and/or performed in parallel. In addition, the method embodiments may include additional steps and/or steps omitted. The scope of the present disclosure is not limited thereto.

Term "including" and variations thereof adopted herein is inclusive, that is "including but not limited to". The term "based on" means "at least partially based on". The term "one embodiment" means "at least one embodiment", and the term "another embodiment" means "at least another embodiment". The term "some embodiments" means "at least some embodiments". Definitions of other terms are provided below.

It should be noted that, the terms "first" "second" and so on mentioned in the present disclosure are only used to distinguishing different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

Names of messages or information interacted between multiple apparatuses in the embodiments of the present disclosure are illustrative rather than limit the scope of the message or information.

Before the embodiments of the present disclosure are described in detail, names and terms involved in the embodiments of the present disclosure are illustrated. The names and terms involved in the embodiments of the present disclosure adapt to the following interpretation.

(1) Direct connection indicates that two devices are connected by a direct connection mode. In a communication channel, no intermediate device is included, other than an amplifier or a repeater for enhancing a signal. In a heat supply system, only several types of hydraulic balance valve are provided for cooperation use without changing an operation manner, an operation parameter and an operation condition of an original heat supply system, to achieve direct connection heat supply.

(2) "In response to" indicates a condition or a status on which an operation to be performed depends. If the condition or status is satisfied, the one or more operations may be performed in a real time manner or performed with a predetermined delay. An order of performing the multiple operations is not limited in the present disclosure without special illustration.

The names and terms involved in the embodiments of the present disclosure are explained above. FIG. 1 is a schematic structural diagram of a system for synchronizing a special effect according to an embodiment of the present disclosure, to support a schematic application. A terminal 400 (including terminals 400-1 and 400-2), a terminal 400-1 and a terminal 400-2 are connected to a server 200 via a network 300. The terminal 400-1 is provided with a special effect producing client, and a user may produce a special effect by the special effect producing client. The terminal 400-2 is provided with a special effect preview client, and the user may preview a special effect file produced by the special effect producing client through the special effect preview client. The terminal 400-1 may be connected to the terminal 400-2 directly or via the server.

The terminal 400-2 is configured to transmit a synchronizing request for synchronizing a special effect file.

The terminal 400-1 is configured to receive the synchronization request for synchronizing the special effect file transmitted by the terminal 400-2; and establish, in response to the synchronization request, a communication link with terminal 400-2 via direct connection if a direct connection condition is satisfied.

The terminal 400-2 is further configured to transmit an acquisition request for the target special effect file to the terminal 400-1 through the communication link.

The terminal 400-1 is further configured to synchronize the target special effect file to the terminal 400-2 in response to the acquisition request.

Figure 2:
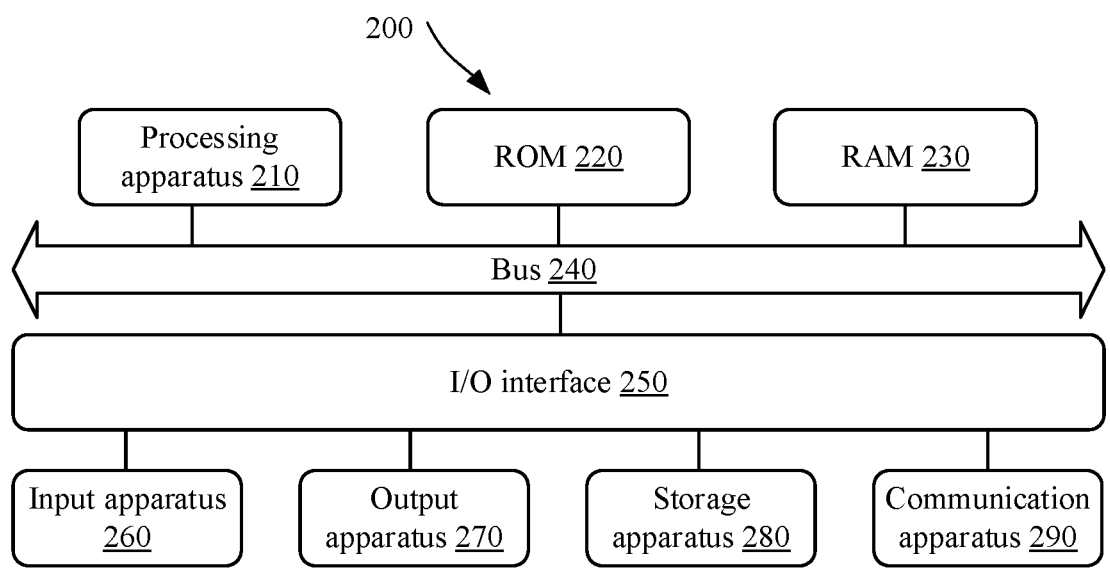
FIG. 2 is a schematic structural diagram of components of an apparatus for synchronizing a special effect according to an embodiment of the present disclosure.

FIG. 2 is a schematic structural diagram of an electronic device 200 according to an embodiment of the present disclosure. The electronic device 200 is configured to implement an apparatus for synchronizing a special effect according to the embodiment of the present disclosure. The electronic device may include a mobile terminal such as a mobile phone, a tablet computer, a digital broadcast receiver, a personal digital assistant (PDA), a tablet computer (PAD), a portable media player (PMP), and a vehicle terminal (such as a vehicle navigation terminal), and fixed terminal such as digital television (TV) and desktop computer. The electronic device shown in FIG. 2 is only schematic, and is not intended to limit the functions and scope of the embodiments of the present disclosure.

As shown in FIG. 2, the apparatus for synchronizing a special effect may include a processing apparatus (such as a central processor and a graphic processor) 210. The processing apparatus may perform various appropriate actions and processing by executing programs stored in a read-only memory (ROM) or programs uploaded from a storage apparatus 280 to a random access memory (RAM) 230. Various programs and data required for operations of the terminal are also stored in the RAM 230. The processing apparatus 210, the ROM 220 and the RAM 230 are connected to each other through the bus 240. An input/output (I/O) interface 250 is also connected to the bus 240.

Generally, the following components are connected to the I/O interface 250: an input apparatus 260 such as a touch screen, a touch panel, a keyboard, a mouse, a camera, a microphone, an accelerometer, and gyroscope; an output apparatus 270 such as a liquid crystal display (LCD), a loudspeaker and a vibrator; a storage apparatus 280 such as a magnetic tape and a hard disk; and a communication apparatus 290. The communication apparatus 290 may allow the terminal to communicate with other device in a wired or wireless manner to exchange data. Although FIG. 2 shows various apparatuses, it should be understood that not all shown apparatuses are necessary. Alternatively, more or less apparatuses may be included.

According to an embodiment of the present disclosure, a process described in the flowchart may be implemented by computer software programs. For example, according to an embodiment of the present disclosure, a computer program product including computer program carried on a computer readable medium is provided. The computer program includes program codes for performing the method shown in the flowchart. In such embodiment, the computer program may be downloaded and installed from the network through the communication apparatus 290, installed from the storage apparatus 280 or installed from the ROM 220. The computer program is executed by the processing apparatus 210 to perform functions defined in the method for synchronizing a special effect in the above embodiment of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

In the embodiments of the present disclosure, the computer readable storage medium may be a tangible medium including or storing programs. The programs may be used by an instruction execution system, apparatus or device, or may be used in combination with the instruction execution system, apparatus or device. In the embodiment of the present disclosure, a computer readable signal medium may include a data signal in a baseband or propagated as a part of carrier. The computer readable signal medium carries computer readable program codes. The propagated data signal may include an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

The computer readable medium may be included in the electronic device 200, or may exist independently and is not installed in the electronic device 200.

The computer readable medium carries one or more programs. The one or more programs are executed by the terminal, so that the terminal performs the method for synchronizing a special effect according to the embodiments of the present disclosure.

Computer program codes for performing operations of the present disclosure may be written by using one or more program design language or any combination. The program design language includes object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the embodiments of the present disclosure show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Figure 3:
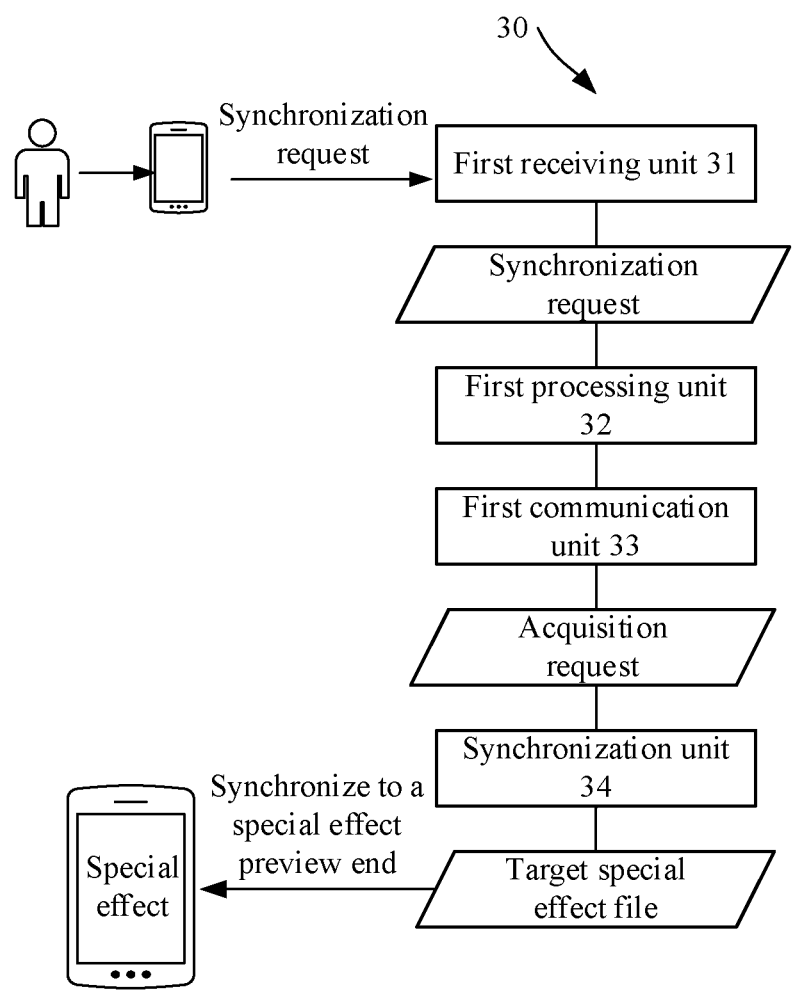
FIG. 3 is a schematic structural diagram of components of an apparatus for synchronizing a special effect according to an embodiment of the present disclosure.

Software implementation of the apparatus for synchronizing a special effect is illustrated according to an embodiment of the present disclosure. FIG. 3 is a schematic structural diagram of components of an apparatus for synchronizing a special effect at a special effect producing end according to an embodiment of the present disclosure. As shown in FIG. 3, the apparatus 30 for synchronizing a special effect in this embodiment includes a first receiving unit 31, a first processing unit 32, a first communication unit 33 and a synchronizing unit 34.

The first receiving unit 31 is configured to receive a synchronization request for synchronizing a special effect file transmitted by a special effect preview end.

The first processing unit 32 is configured to establish, in response to the synchronization request, a communication link with a special effect preview end via direct connection if a direct connection condition is satisfied.

The first communication unit 33 is configured to receive an acquisition request for a target special effect file through the communication link.

The synchronization unit 34 is configured to synchronize the target special effect file to the special effect preview end in response to the acquisition request.

It should be noted that, classification of the above units does not limit the electronic device. For example, one unit may be divided into two or more subunits, or multiple units may be combined to form a new unit.

It should be further noted that, names of the above units do not limit the units in some cases. For example, the first receiving unit 31 may indicate a unit configured to receive the synchronization request for synchronizing the special effect file transmitted by the special effect preview end.

Based on similar reasons, units and/or modules of the electronic device not described in detail do not indicate that the units and/or modules may be omitted, and operations performed by the electronic device each may be implemented by corresponding units and/or modules in the electronic device.

Figure 4:
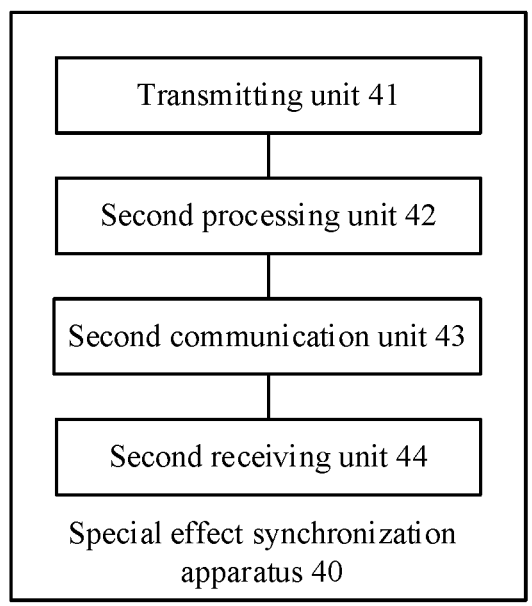
FIG. 4 is a schematic structural diagram of components of an apparatus for synchronizing a special effect according to an embodiment of the present disclosure.

Software implementation of the apparatus for synchronizing a special effect is further illustrated according to an embodiment of the present disclosure. FIG. 4 is a schematic structure diagram of components of an apparatus for synchronizing a special effect at a special effect preview end according to an embodiment of the present disclosure. As shown in FIG. 4, the apparatus 40 for synchronizing the special effect includes a transmitting unit 41, a second processing nit 42, a second communication unit 43 and a second receiving unit 44.

The transmitting unit 41 is configured to transmit a synchronization request for synchronizing a special effect file to a special effect producing end.

The second processing unit 42 is configured to establish a communication link with the special effect producing end via direct connection, based on a response that the special effect producing end determines that a direct connection condition is satisfied in response to the synchronization request.

The second communication unit 43 is configured to transmit an acquisition request for the target special effect file through the communication link.

The second receiving unit 44 is configured to receive a target special effect file synchronized by the special effect producing end.

Figure 5:
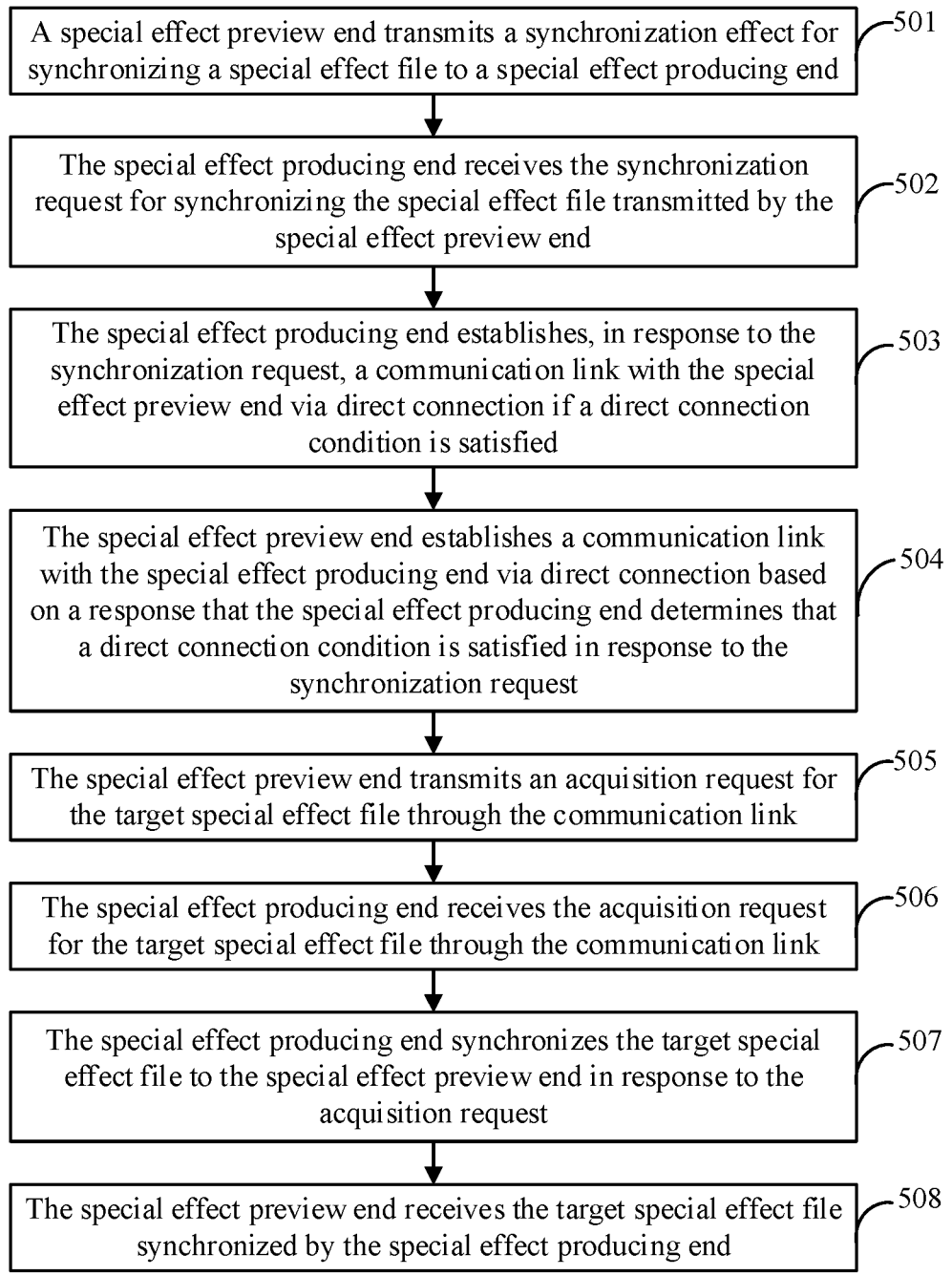
FIG. 5 is a schematic flowchart of a method for synchronizing a special effect according to an embodiment of the present disclosure.

FIG. 5 is a schematic flowchart of a method for synchronizing a special effect according to an embodiment of the present disclosure. As shown in FIG. 5, the method includes steps 501 to 508 as follows.

In step 501, a special effect preview end transmits a synchronization request for synchronizing a special effect file to a special effect producing and.

In an actual application, the special effect preview end is provided with a special effect preview client. A user may preview the special effect by the special effect preview client. For example, the user triggers a special effect synchronization instruction by a special effect synchronization key displayed on the special effect preview end, to instruct the special effect preview end to transmit the synchronization request for synchronizing the special effect file to the special effect producing end. Alternatively, when the special effect preview client is started, the special effect preview end automatically transmits the synchronization request for synchronizing the special effect file to the special effect producing end.

In some embodiments, the synchronization request may be transmitted to a multicast group where the special effect producing end is located by the special effect preview end. The special effect preview end acquires a multicast address of the multicast group where the special effect producing end is located; and transmits the synchronization request for synchronizing the special effect file to the special effect producing end based on the multicast address of the multicast group.

In an actual application, the special effect preview end may adopt a mobile network or a wireless fidelity (Wi-Fi) network. The special effect preview end may be located in a same local area network with the special effect producing end only when the special effect preview end adopts the Wi-Fi network. Therefore, before transmitting the synchronization request for synchronizing the special effect file, the special effect preview end needs to determine whether the special effect preview end adopts the Wi-Fi network. In a case that the special effect preview end adopts the Wi-Fi, the special effect preview end acquires the multicast address of the multicast group where the special effect producing end is located, and transmits the synchronization request to the multicast address. For example, the address of the multicast group where the special effect producing end is 234.6.6.6, the special effect preview end transmits the synchronization request to 234.6.6.6.

In some embodiments, the synchronization request may be transmitted in a form of a bluetooth connection signal.

In an actual implementation, the special effect preview end acquires a device which can be connected via Bluetooth by scanning. In a case that a special effect producing end exists in the device which can be connected via Bluetooth, the special effect producing end is selected. A bluetooth connection signal is transmitted to the special effect producing end, to request to establish Bluetooth connection with the special effect producing end.

In step 502, the special effect producing end receives the synchronization request for synchronizing the special effect file transmitted by the special effect preview end.

In some embodiments, when the special effect preview end transmits the synchronization request based on the multicast address of the multicast group where the special effect producing end is located, the special effect producing end receives the synchronization request for synchronizing the special effect file through a multicast group, in response to a special effect producing end being located in the multicast group presently.

In step 503, the special effect producing end establishes a communication link with the special effect preview end via direct connection in response to the synchronization request, if it is determined that a direct connection condition is satisfied.

In step 504, the special effect preview end establishes a communication link with the special effect producing end via direct connection based on a response that the special effect producing end determines that the direct connection condition is satisfied in response to the synchronization request.

In some embodiments, the special effect producing end establishes the communication link with the special effect preview end via direct connection in response to the synchronization request, if the special effect producing end is located in same local area network with the special effect preview end.

In an actual application, it is determined whether the special effect producing end and the special effect preview end are located in a same local area network by determining whether the special effect preview end and the special effect producing end are located in a same multicast group. In a case that the special effect preview end and the special effect producing end are located in the same multicast group, the special effect preview end transmits the synchronization request to the multicast address of the multicast group where the special effect producing end is located, and the special effect producing end can receive the synchronization request; otherwise, the special effect producing end cannot receive the synchronization request transmitted by the special effect preview end.

In some embodiments, in a case that the special effect producing end and the special effect preview end are located in the same local area network, the special effect producing end and the special effect preview end may establish a communication link via direct connection as follows. The special effect producing end displays a graphic code via a graphical interface. The graphic code includes an IP address of the special effect producing end. The special effect preview end scans the graphic code to obtain the IP address of the special effect preview end. The special effect preview end transmits a link establishing request to the IP address of the special effect producing end. The special effect producing end receives the link establishing request transmitted by the special effect preview end. The special effect producing end and the special effect preview end establish the communication link via direct connection.

In an actual application, the graphic code may be a two-dimensional code, Applet and so on. When the special effect producing end and the special effect preview end are located in the same local area network, the special effect producing end automatically triggers a two-dimensional code display instruction, and displays the two-dimensional code through the graphical display interface. The two-dimensional code includes the IP address of the special effect producing end. The user triggers a camera of the special effect preview end to start by clicking a two-dimensional code scanning key of the special effect preview end. The camera scans the two-dimensional code generated by the special effect producing end to obtain the IP address of the special effect producing end.

In some embodiments, the special effect producing end establishes the communication link with the special effect preview end via direct connection in response to the synchronization request transmitted in a form of a Bluetooth connection signal by the special effect preview end, if it is determined that the direct connection condition is satisfied.

In an actual implementation, the special effect preview end transmits the Bluetooth connection signal to the special effect producing end. The user selects to agree with connection by the special effect producing end. In response to the synchronization request transmitted by the special effect preview end, the special effect producing end establishes connection with the special effect preview end via Bluetooth.

In some embodiments, in response to the synchronization request, the special effect producing end synchronizes the target special effect file to a special effect development platform if it is determined that a direct connection condition is not satisfied. The special effect producing end displays a graphic code via a graphical interface. The graphic code includes a file identifier of the target special effect file. The special effect preview end scans the graphic code to obtain the file identifier, and acquires the target special effect file from the special effect development platform based on the obtained file identifier.

In some embodiments, in a case that the special effect producing end or the special end preview end fails to be connected with the special effect development platform, that is, the special effect producing end fails to upload the target special effect file to the special effect development platform or the special effect preview end fails to acquire the target special effect file from the special effect development platform, prompt information is displayed on the special effect producing end and/or the special effect preview end, to instruct the user to connect both the special effect producing end and the special effect preview and to the same local area network.

In step 505, the special effect preview end transmits the acquisition request for the target special effect file through the communication link.

Here, the target special effect file is a special effect file to be synchronized to the special effect preview end for previewing by the user, and the acquisition request of the target special effect file includes a file identifier of the target special effect file. In a case that the communication link is established based on the local area network, the file identifier may be included in the graphic code and the special effect preview end scans the graphic code displayed by the special effect producing end to obtain the file identifier. In a case that the communication link is established based on the Bluetooth, the file identifier may be transmitted to the special effect preview end by the special effect producing end via Bluetooth.

In step 506, the special effect producing end receives the acquisition request for the target special effect file through the communication link.

In step 507, the special effect producing end synchronizes the target special effect file to the special effect preview end in response to the acquisition request.

In some embodiments, the special effect producing end may synchronize the target special effect file to the special effect preview end in response to the acquisition request as follows. The special effect producing end analyzes the acquisition request transmitted by the special effect preview end to obtain the file identifier of the target special effect file; and synchronizes the target special effect file to the special effect preview end based on the file identifier. The file identifier is obtained by scanning the image code by the special effect preview end.

In an actual application, the special effect producing end searches for a storage position of the target file in the special effect producing end based on the acquired file identifier, to obtain the target special effect file, and transmits the acquired target special effect file to the special effect preview end.

In step 508, the special effect preview end receives the target special effect file synchronized by the special effect producing end.

In an actual implementation, the special effect preview end displays a special effect of the target special effect file after receiving the target special effect file synchronized by the special effect producing end.

According to the embodiment of the present disclosure, a communication link is established with a special effect preview end via direct connection if a direct connection condition is satisfied, and a target special effect file is synchronized to the special effect preview end through the communication link. The communication link is established with the special effect preview end via direct connection, so that the target special effect file can be directly synchronized to the special effect preview end rather than the special effect file is uploaded to the special effect development platform for temporary transmission and then the special effect file is downloaded from the special effect development platform, thereby avoiding generating unnecessary traffic for the special effect development platform and shortening preview time.

Figure 6:
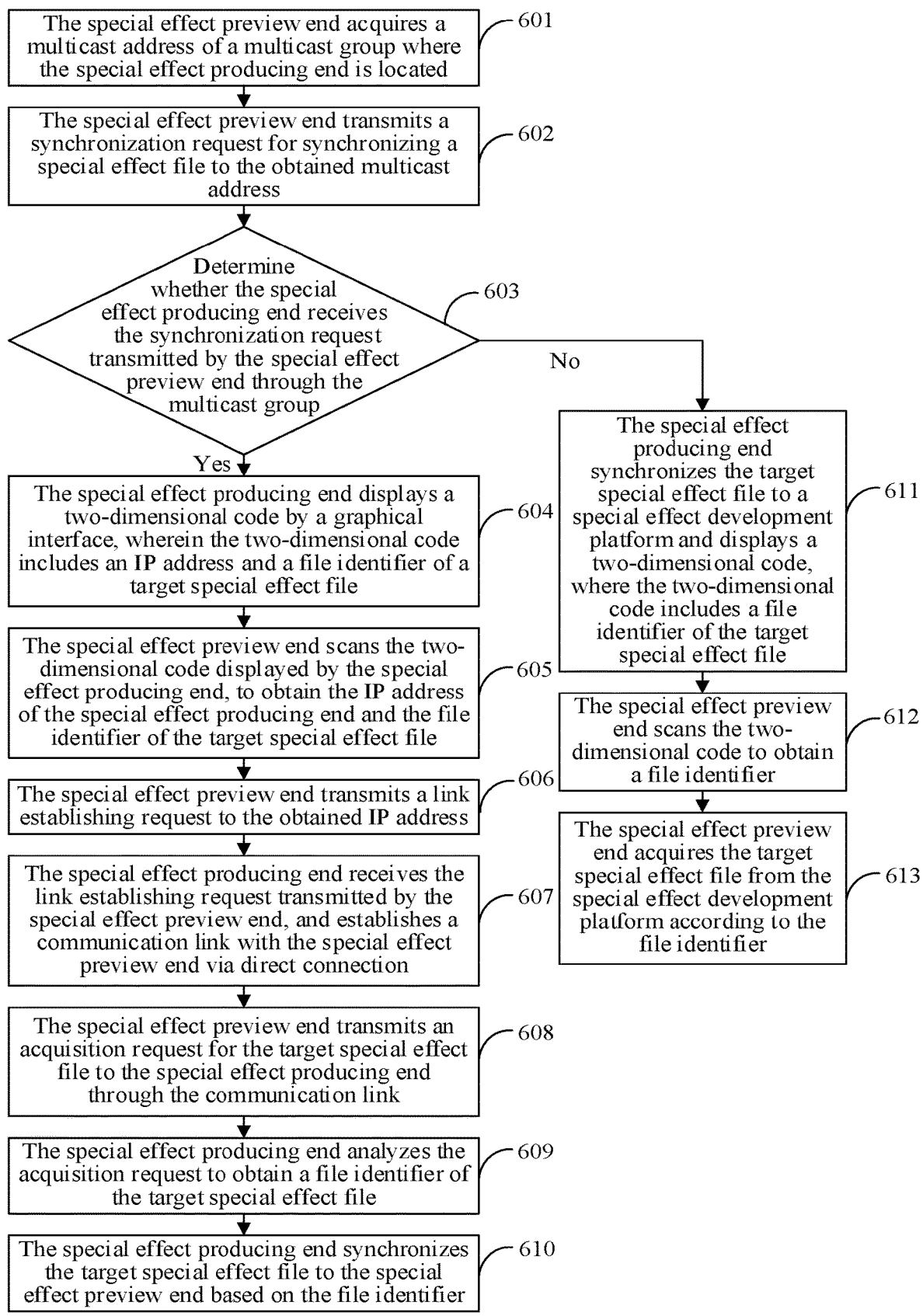
FIG. 6 is a schematic flowchart of a method for synchronizing a special effect according to an embodiment of the present disclosure.

In the following description, it is assumed that the special effect producing end is directly connected to the special effect preview end over the local area network. FIG. 6 is a schematic flowchart of a method for synchronizing a special effect according to an embodiment of the present disclosure. As shown in FIG. 6, the method in this embodiment includes steps 601 to 613 as follows.

In step 601, the special effect preview end acquires a multicast address of a multicast group where the special effect producing end is located.

In step 602, the special effect preview end transmits a synchronization request for synchronizing a special effect file to the acquired multicast address.

In step 603, the special effect producing end determines whether the synchronization request transmitted by the special effect preview end is received by the multicast group; step 604 is performed if a determination result is positive in step 603; otherwise, step 611 is performed.

In step 604, the special effect producing end displays a two-dimensional code by a graphic interface. The two-dimensional code includes an internet protocol IP address and a file identifier of the target special effect file.

In step 605, the special effect preview end scans the two-dimensional code displayed by the special effect producing end, to obtain the IP address of the special effect producing end and the file identifier of the target special effect file.

In step 606, the special effect preview end transmits a link establishing request to the IP address obtained by scanning the two-dimensional code.

In step 607, the special effect producing end receives the link establishing request transmitted by the special effect preview end, and establishes the communication link with the special effect preview end by direct connection.

In step 608, the special effect preview end transmits the acquisition request for the target special effect file to the special effect producing end by the communication link.

In an actual implementation, the acquisition request includes a file identifier of the target special effect file. The file identifier is obtained by scanning the two-dimensional code displayed on the special effect producing end by the special effect preview end.

In step 609, the special effect producing end analyzes the acquisition request to obtain the file identifier of the target special effect file.

In step 610, the special effect producing end synchronizes the target special effect file to the special effect preview end based on the file identifier.

In step 611, the special producing end synchronizes the target special effect file to a special effect development platform, and displays a two-dimensional code by a graphic interface. The two-dimensional code includes a file identifier of the target special effect file.

In step 612, the special effect preview end scans the two-dimensional code to obtain the file identifier.

In step 613, the special effect preview end acquires the target special effect file from the special effect development platform based on the file identifier.

Figure 7:
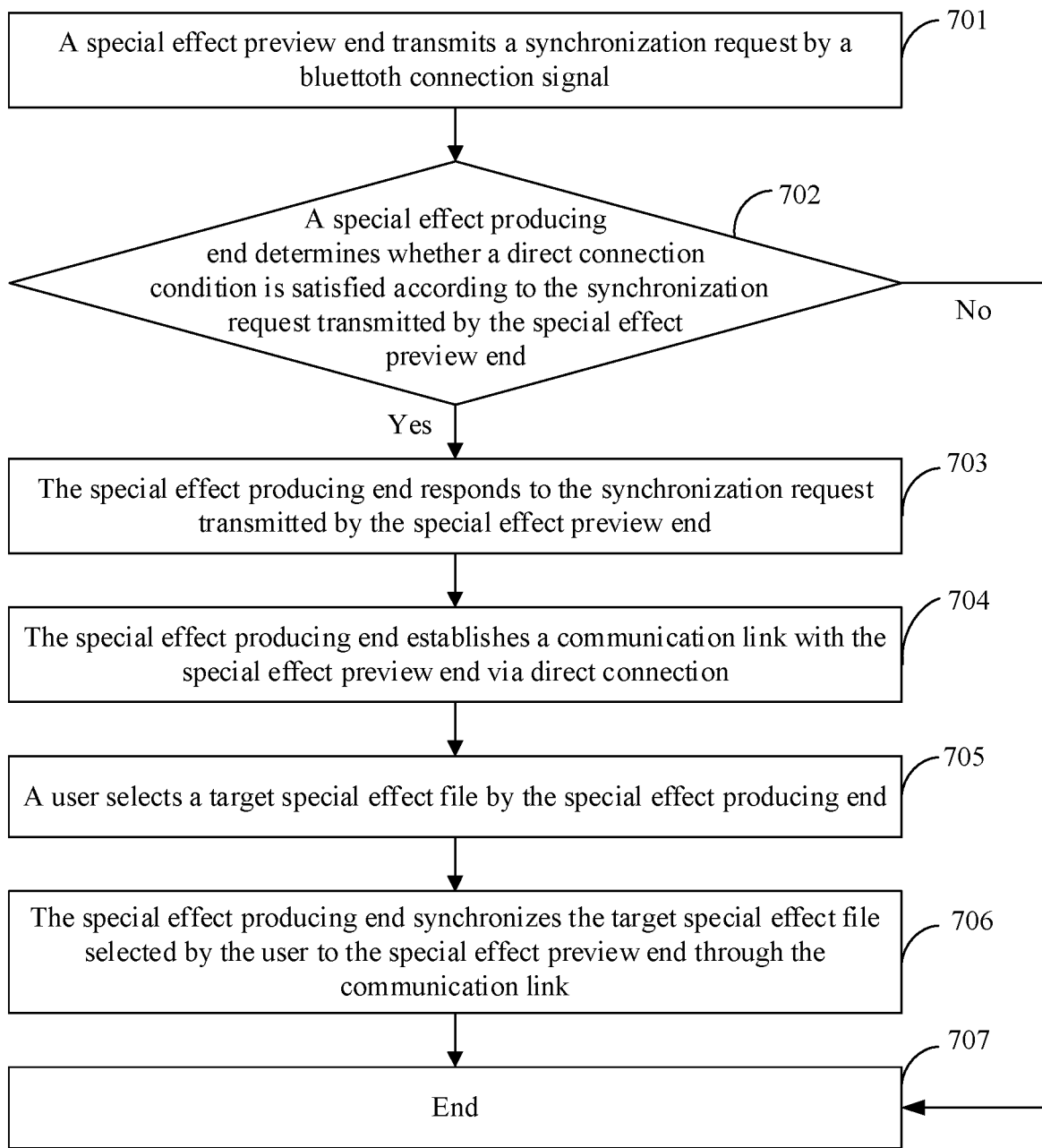
FIG. 7 is a schematic flowchart of a method for synchronizing a special effect according to an embodiment of the present disclosure.

In the following description, it is assumed that the special effect producing end is directly connected to the special effect preview end by Bluetooth. FIG. 7 is a schematic flowchart of a method for synchronizing a special effect according to an embodiment of the present disclosure. As shown in FIG. 7, the method in this embodiment includes steps 701 to 707 in the following.

In step 701, the special effect preview end transmits a synchronization request in a form of a Bluetooth connection signal.

In an actual implementation, the special effect preview end searches for devices around which can be connected by Bluetooth, and the special effect preview end may display a list of devices which can be connected by Bluetooth. The user selects a device to be connected from the displayed list of devices, and transmits a synchronize request to the special effect producing end in a form of a Bluetooth connection signal.

In step 702, the special effect producing end determines whether a direct connection condition is satisfied in response to the synchronization request transmitted by the special effect preview end; step 703 is performed if a determination result in step 702 is positive; otherwise, step 707 is performed.

In an actual implementation, the synchronization request transmitted by the special effect preview end includes an identifier of the special effect preview end. The user selects whether to establish a Bluetooth connection with the special effect preview end based on the identifier of the special effect producing end.

In step 703, the special effect producing end responds to the synchronization request transmitted by the special effect preview end.

In an actual implementation, the special effect producing end responds to the synchronization request transmitted by the special effect preview end, when the user selects to establish the Bluetooth connection with the special effect preview end by the special effect producing end.

In step 704, the special effect producing end establishes a communication link with the special effect preview end via direct connection.

In step 705, the user selects a target special effect file by the special effect producing end.

In an actual implementation, the special effect producing end may display multiple special effect files produced by the user. The user may select the target special effect file by clicking the special effect file displayed by the special effect producing end.

In step 706, the special effect producing end synchronizes the target special effect file selected by the user to the special effect preview end through the communication link.

In some embodiments, the special effect producing end may transmit multiple special effect files produced by the user to the special effect preview end through the communication link, and the user selects the target special effect file to be previewed by the special effect preview end to receive the target special effect file transmitted by the special effect producing end.

In step 707, the flow ends.

According to one or more embodiments of the present disclosure, a method for synchronizing a special effect is provided. The method includes: receiving a synchronization request for synchronizing a special effect file transmitted by a special effect preview end; establishing, in response to the synchronization request, a communication link with the special effect preview end via direct connection if a direct connection condition is satisfied; receiving an acquisition request for a target special effect file through the communication link; and synchronizing the target special effect file to the special effect preview end in response to the acquisition request.

According to one or more embodiments of the present disclosure, the process of receiving a synchronization request for synchronizing a special effect file transmitted by a special effect preview end includes: receiving the synchronization request for synchronizing a special effect file through a multicast group, in response to a special effect producing end being currently located in the multicast group. The synchronization request is transmitted by the special effect preview end based on a multicast address of the multicast group.

According to one or more embodiments of the present disclosure, the process of establishing, in response to the synchronization request, a communication link with the special effect preview end via direct connection if a direct connection condition is satisfied includes: establishing, in response to the synchronization request, a communication link with the special effect preview end via direct connection if it is determined that a special effect producing end and the special effect preview end are located in a same local area network.

According to one or more embodiments of the present disclosure, the process of establishing a communication link with the special effect preview end via direct connection includes: displaying a graphic code via a graphical interface, where the graphic code includes an internet protocol (IP) address; receiving a link establishing request transmitted by the special effect preview end based on the IP address, where the IP address is obtained by scanning the graphical code by the special effect preview end; and establishing a communication link with the special effect preview end via direct connection.

According to one or more embodiments of the present disclosure, the process of synchronizing the target special effect file to the special effect preview end in response to the acquisition request includes: analyzing the acquisition request to obtain a file identifier of the target special effect file; and synchronizing the target special effect file to the special effect preview end based on the file identifier. The file identifier is obtained by scanning the graphic code by the special effect preview end.

According to one or more embodiments of the present disclosure, the process of establishing, in response to the synchronization request, a communication link with the special effect preview end via direct connection if a direct connection condition is satisfied includes: establishing, in response to a synchronization request transmitted in a form of a bluetooth connection signal, a communication link with the special effect preview end via direct connection if the direct connection condition is satisfied.

According to one or more embodiments of the present disclosure, the method further includes: synchronizing, in response to the synchronization request, the target special effect file to a special effect development platform if the direct connection condition is not satisfied; and displaying a graphic code via a graphical interface, where the graphic code includes a file identifier of the target special effect file and the file identifier is obtained by scanning the graphic code by the special effect preview end; and acquiring the target special effect file from the special effect development platform based on the obtained file identifier.

According to one or more embodiments of the present disclosure, the method further includes: displaying prompt information when the target special effect file fails to be synchronized to the special effect development platform, where the prompt information indicates connecting to a local area network where the special effect preview end is located.

According to one or more embodiments of the present disclosure, a method for synchronizing a special effect is provided. The method includes: transmitting a synchronization request for synchronizing a special effect file to a special effect producing end; establishing a communication link with the special effect producing end via direct connection based on a response that the special effect producing end determines that a direct connection condition is satisfied in response to the synchronization request; transmitting an acquisition request for a target special effect file through the communication link; and receiving the target special effect file synchronized by the special effect producing end.

According to one or more embodiments of the present disclosure, the process of transmitting a synchronization request for synchronizing a special effect file to a special effect producing end includes: acquiring a multicast address of a multicast group where the special effect producing end is located; and transmitting the synchronization request for synchronizing the special effect file to the special effect producing end based on the multicast address of the multicast group.

According to one or more embodiments of the present disclosure, the process of establishing a communication link with the special effect producing end via direct connection based on a response that the special effect producing end determines that a direct connection condition is satisfied in response to the synchronization request includes: establishing a communication link with the special effect preview end via direct connection based on a response that it is determined that a special effect producing end and the special effect preview end are located in a same local area network in response to the synchronization request.

According to one or more embodiments of the present disclosure, the process of establishing a communication link with the special effect producing end via direct connection based on a response that it is determined that a special effect producing end and the special effect preview end are located in a same local area network in response to the synchronization request includes: scanning a graphic code displayed by a graphical interface of the special effect producing end, to obtain an IP address of the special effect producing end, where the graphic code includes the IP address of the special effect producing end; transmitting a link establishing request based on the IP address; and establishing a communication link with the special effect producing end via direct connection.

According to one or more embodiments of the present disclosure, the process of receiving the target special effect file synchronized by the special effect producing end includes: receiving the target special effect file synchronized by the special effect producing end based on a file identifier, where the file identifier is obtained by analyzing the acquisition request by the special effect producing end.

According to one or more embodiments of the present disclosure, the process of establishing a communication link with the special effect producing end via direct connection based on a response that the special effect producing end determines that a direct connection condition is satisfied in response to the synchronization request includes: establishing a communication link with the special effect producing end via direct connection based on a response that the special effect producing end determines that a direct connection condition is satisfied in response to the synchronization request transmitted in a form of a Bluetooth connection signal.

According to one or more embodiments of the present disclosure, the method further includes: scanning a graphic code displayed when the special effect producing end determines that the direct connection condition is not satisfied in response to the synchronization request, to obtain a file identifier of the target special effect file; and acquiring the target special effect file synchronized to the special effect development platform by the special effect producing end based on the file identifier.

According to one or more embodiments of the present disclosure, the method further includes: displaying prompt information when the target special effect file synchronized to the special effect development platform by the special effect producing end fails to be acquired, where the prompt information indicates connecting to a local area network where the special effect producing end is located.

According to one or more embodiments of the present disclosure, an apparatus for synchronizing a special effect is provided. The apparatus includes a first receiving unit, a first processing unit, a first communication unit and a synchronization unit. The first receiving unit is configured to receive a synchronization request for synchronizing a special effect file transmitted by a special effect preview end. The first processing unit is configured to establish, in response to the synchronization request, a communication link with the special effect preview end via direct connection if a direct connection condition is satisfied. The first communication unit is configured to receive an acquisition request for a target special effect file through the communication link.

The synchronization unit is configured to synchronize the target special effect file to the special effect preview end in response to the acquisition request.

According to one or more embodiments of the present disclosure, the first receiving unit is further configured to receive the synchronization request for synchronizing a special effect file through a multicast group, in response to a special effect producing end being currently located in the multicast group. The synchronization request is transmitted by the special effect preview end based on a multicast address of the multicast group.

According to one or more embodiments of the present disclosure, the first processing unit is further configured to establish, in response to the synchronization request, a communication link with the special effect preview end via direct connection if it is determined a special effect producing end and the special effect preview end are located in a same local area network.

According to one or more embodiments of the present disclosure, the first processing unit is further configured to display a graphic code via a graphical interface, where the graphic code includes an IP address; receive a link establishing request transmitted by the special effect preview end based on the IP address, where the IP address is obtained by scanning the graphical code by the special effect preview end; and establish a communication link with the special effect preview end via direct connection.

According to one or more embodiments of the present disclosure, he synchronization unit is further configured to: analyze the acquisition request to obtain a file identifier of the target special effect file; and synchronize the target special effect file to the special effect preview end based on the file identifier. The file identifier is obtained by scanning the graphic code by the special effect preview end.

According to one or more embodiments of the present disclosure, the first processing unit is further configured to: establish, in response to a synchronization request transmitted in a form of a bluetooth connection signal, a communication link with the special effect preview end via direct connection if the direct connection condition is satisfied.

According to one or more embodiments of the present disclosure, the first processing unit is further configured to: synchronize, in response to the synchronization request, the target special effect file to a special effect development platform if the direct connection condition is not satisfied; and display a graphic code via a graphical interface, where the graphic code includes a file identifier of the target special effect file and the file identifier is obtained by scanning the graphic code by the special effect preview end; and acquiring the target special effect file from the special effect development platform based on the obtained file identifier.

According to one or more embodiments of the present disclosure, the first displaying unit is further configured to: display prompt information when the target special effect file fails to be synchronized to the special effect development platform, where the prompt information indicates connecting to a local area network where the special effect preview end is located.

According to one or more embodiments of the present disclosure, an apparatus for synchronizing a special effect is provided. The apparatus includes a transmitting unit, a second processing unit, a second communication unit and a second receiving unit. The transmitting unit is configured to: transit a synchronization request for synchronizing a special effect file to a special effect producing end. The second processing unit is configured to establish a communication link with the special effect producing end via direct connection based on a response that the special effect producing end determines that a direct connection condition is satisfied in response to the synchronization request. The second communication unit is configured to transmit an acquisition request for a target special effect file through the communication link. The second receiving unit is configured to: receive the target special effect file synchronized by the special effect producing end.

According to one or more embodiments of the present disclosure, the transmitting unit is configured to: acquire a multicast address of a multicast group where the special effect producing end is located; and transmit the synchronization request for synchronizing the special effect file to the special effect producing end based on the multicast address of the multicast group.

According to one or more embodiments of the present disclosure, the second processing unit is further configured to: establish a communication link with the special effect preview end via direct connection based on a response that it is determined a special effect producing end and the special effect preview end are located in a same local area network in response to the synchronization request.

According to one or more embodiments of the present disclosure, the second processing unit is further configured to: scan a graphic code displayed by a graphical interface of the special effect producing end, to obtain an IP address of the special effect producing end, where the graphic code includes the IP address of the special effect producing end; transmit a link establishing request based on the IP address; and establish a communication link with the special effect producing end via direct connection.

According to one or more embodiments of the present disclosure, the second receiving unit is further configured to: receive the target special effect file synchronized by the special effect producing end based on a file identifier. The file identifier is obtained by analyzing the acquisition request by the special effect producing end.

According to one or more embodiments of the present disclosure, the second processing unit is further configured to: establish a communication link with the special effect producing end via direct connection based on a response that the special effect producing end determines that a direct connection condition is satisfied in response to the synchronization request transmitted in a form of a Bluetooth connection signal.

According to one or more embodiments of the present disclosure, the second processing unit is further configured to: scan a graphic code displayed when the special effect producing end determines that the direct connection condition is not satisfied in response to the synchronization request, to obtain a file identifier of the target special effect file.

The second receiving unit is further configured to acquire the target special effect file synchronized to the special effect development platform by the special effect producing end, based on the file identifier.

According to one or more embodiments of the present disclosure, the apparatus further includes a second display unit configured to: display prompt information when the target special effect file synchronized to the special effect development platform by the special effect producing end fails to be acquired. The prompt information indicates connecting to a local area network where the special effect producing end is located.

According to one or more embodiments of the present disclosure, a terminal is provided. The terminal includes a first memory and a first processor. The first memory is configured to store an executable instruction. The first processor is configured to execute the executable instruction stored in the first memory to perform the method for synchronizing a special effect according to the embodiments of the present disclosure.

According to one or more embodiments of the present disclosure, a terminal is provided. The terminal includes a second memory and a second processor. The second memory is configured to store an executable instruction. The second processor is configured to execute the executable instruction stored in the second memory, to perform the method for synchronizing a special effect according to the embodiments of the present disclosure.

According to one or more embodiments of the present disclosure, a storage medium storing an executable instruction is provided. The executable instruction is executed to perform the method for synchronizing a special effect according to the embodiments of the present disclosure.

According to one or more embodiments of the present disclosure, a storage medium storing an executable instruction is provided. The executable instruction is executed to perform the method for synchronizing a special effect according to the embodiments of the present disclosure.

The embodiments and the technical principles of the present disclosure are described above. Those skilled in the art should understand that the present disclosure is not limited to the technical solutions formed by specific combinations of the above technical features, and other technical solutions formed by any combination of the above technical solutions or equivalent features thereof without departing the concept of the present disclosure also fall within the scope of the present disclosure. For example, the technical solution formed by exchanging between the above features and technical features with similar functions disclosed (not limited to) in the present disclosure falls within the scope of the present disclosure.

Although the operations are described in a certain order, it should be understood that the operations are unnecessary to be performed in the certain order or in a sequential order. In a certain environment, multiple task parallel processing may be beneficial. Similarly, although specific implementation details are described above, the details are not intended to limit the scope of the present disclosure. Features described in context of a single embodiment may be combined with features in other embodiments. In addition, the features described in context of a single embodiment may be implemented in multiple embodiments independently or via an appropriate sub-combination.

Although the subject matter is described by using language specific to structure features and/or method logic operations, the subject matter defined in the attached claims is not limited to the specific features or operations described above. In fact, the described specific features and operations are only exemplary and are not intended to limit the claims.

The invention claimed is:

1. A method for synchronizing a special effect, comprising:
receiving a synchronization request for synchronizing a special effect file transmitted by a special effect preview end;
establishing, in response to the synchronization request, a communication link with the special effect preview end via direct connection in response to determining that a direct connection condition is satisfied, wherein the establishing, in response to the synchronization request, a communication link with the special effect preview end via direct connection in response to determining that a direct connection condition is satisfied further comprises establishing, in response to the synchronization request, the communication link with the special effect preview end via the direct connection in response to determining that a special effect producing end and the special effect preview end are located in a same local area network;
receiving an acquisition request for a target special effect file through the communication link; and
synchronizing the target special effect file to the special effect preview end in response to the acquisition request.

2. The method according to claim 1, wherein the receiving a synchronization request for synchronizing a special effect file transmitted by a special effect preview end comprises:
receiving the synchronization request for synchronizing a special effect file through a multicast group, in response to a special effect producing end being currently located in the multicast group,
wherein the synchronization request is transmitted by the special effect preview end based on a multicast address of the multicast group.

3. The method according to claim 1, wherein the establishing a communication link with the special effect preview end via direct connection comprises:
displaying a graphic code via a graphical interface, wherein the graphic code comprises an internet protocol (IP) address;
receiving a link establishing request transmitted by the special effect preview end based on the IP address, wherein the IP address is obtained by scanning the graphical code by the special effect preview end; and
establishing a communication link with the special effect preview end via direct connection.

4. The method according to claim 3, wherein the synchronizing the target special effect file to the special effect preview end in response to the acquisition request comprises:
analyzing the acquisition request to obtain a file identifier of the target special effect file; and
synchronizing the target special effect file to the special effect preview end based on the file identifier,
wherein the file identifier is obtained by scanning the graphic code by the special effect preview end.

5. The method according to claim 1, wherein the establishing, in response to the synchronization request, a communication link with the special effect preview end via direct connection in response to determining that a direct connection condition is satisfied comprises:
establishing, in response to a synchronization request transmitted in a form of a bluetooth connection signal, the communication link with the special effect preview end via direct connection in response to determining that the direct connection condition is satisfied.

6. The method according to claim 1, further comprising:
synchronizing, in response to the synchronization request, the target special effect file to a special effect development platform in response to determining that the direct connection condition is not satisfied; and
displaying a graphic code via a graphical interface, wherein the graphic code comprises a file identifier of the target special effect file and the file identifier is obtained by scanning the graphic code by the special effect preview end; and acquiring the target special effect file from the special effect development platform based on the obtained file identifier.

7. The method according to claim 6, further comprising:
displaying prompt information when the target special effect file fails to be synchronized to the special effect development platform, wherein the prompt information indicates connecting to a local area network where the special effect preview end is located.

8. A method for synchronizing a special effect, comprising:
transmitting a synchronization request for synchronizing a special effect file to a special effect producing end;
establishing a communication link with the special effect producing end via direct connection based on a response that the special effect producing end determines that a direct connection condition is satisfied in response to the synchronization request, wherein the establishing a communication link with the special effect producing end via direct connection based on a response that the special effect producing end determines that a direct connection condition is satisfied further comprises establishing the communication link with the special effect producing end via direct connection in response to determining that a special effect preview end and the special effect producing end are located in a same local area network;
transmitting an acquisition request for a target special effect file through the communication link; and
receiving the target special effect file synchronized by the special effect producing end.

9. The method according to claim 8, wherein the transmitting a synchronization request for synchronizing a special effect file to a special effect producing end comprises:
acquiring a multicast address of a multicast group where the special effect producing end is located; and
transmitting the synchronization request for synchronizing the special effect file to the special effect producing end based on the multicast address of the multicast group.

10. The method according to claim 8, wherein the establishing the communication link with the special effect producing end via direct connection in response to determining that a special effect preview end and the special effect producing end are located in a same local area network further comprises:
scanning a graphic code displayed by a graphical interface of the special effect producing end, to obtain an IP address of the special effect producing end, wherein the graphic code comprises the IP address of the special effect producing end;
transmitting a link establishing request based on the IP address; and
establishing a communication link with the special effect producing end via direct connection.

11. The method according to claim 10, wherein the receiving the target special effect file synchronized by the special effect producing end comprises:
receiving the target special effect file synchronized by the special effect producing end based on a file identifier, wherein the file identifier is obtained by analyzing the acquisition request by the special effect producing end.

12. The method according to claim 8, wherein the establishing a communication link with the special effect producing end via direct connection based on a response that the special effect producing end determines that a direct connection condition is satisfied in response to the synchronization request comprises:
establishing the communication link with the special effect producing end via direct connection based on a response that the special effect producing end determines that the direct connection condition is satisfied in response to the synchronization request transmitted in a form of a Bluetooth connection signal.

13. The method according to claim 8, further comprising:
scanning a graphic code displayed when the special effect producing end determines that the direct connection condition is not satisfied in response to the synchronization request, to obtain a file identifier of the target special effect file; and
acquiring the target special effect file synchronized to the special effect development platform by the special effect producing end based on the file identifier.

14. The method according to claim 13, further comprising:
displaying prompt information when the target special effect file synchronized to the special effect development platform by the special effect producing end fails to be acquired, wherein the prompt information indicates connecting to a local area network where the special effect producing end is located.

15. An apparatus for synchronizing a special effect, comprising:
at least one processor; and
at least one memory communicatively coupled to the at least one processor and storing instructions that upon execution by the at least one processor cause the apparatus to:
receive a synchronization request for synchronizing a special effect file transmitted by a special effect preview end;
establish, in response to the synchronization request, a communication link with the special effect preview end via direct connection in response to determining that a direct connection condition is satisfied;
receive an acquisition request for a target special effect file through the communication link;
synchronize the target special effect file to the special effect preview end in response to the acquisition request; and
wherein the at least one memory further stores instructions that upon execution by the at least one processor cause the apparatus to:
establish, in response to the synchronization request, the communication link with the special effect preview end via direct connection in response to determining that a special effect producing end and the special effect preview end are located in a same local area network.

16. A non-transitory storage medium storing an executable instruction, wherein the executable instruction is executed to perform the method for synchronizing a special effect according to claim 1, bearing computer-readable instructions that upon execution on a computing device cause the computing device at least to:
receive a synchronization request for synchronizing a special effect file transmitted by a special effect preview end;
establish, in response to the synchronization request, a communication link with the special effect preview end via direct connection in response to determining that a direct connection condition is satisfied;
receive an acquisition request for a target special effect file through the communication link;
synchronize the target special effect file to the special effect preview end in response to the acquisition request; and wherein the non-transitory storage medium further bears computer-readable instructions that upon execution on the computing device cause the computing device at least to:

establish, in response to the synchronization request, the communication link with the special effect preview end via direct connection in response to determining that a special effect producing end and the special effect preview end are located in a same local area network.

17. The apparatus of claim 15, the at least one memory further storing instructions that upon execution by the at least one processor cause the apparatus to:

receive the synchronization request for synchronizing a special effect file through a multicast group, in response to a special effect producing end being currently located in the multicast group, wherein the synchronization request is transmitted by the special effect preview end based on a multicast address of the multicast group.

* * * * *